United States Patent [19]

Lee et al.

[11] Patent Number: 6,117,596

[45] Date of Patent: Sep. 12, 2000

[54] ORGANIC ELECTROLYTE AND LITHIUM SECONDARY CELL EMPLOYING THE SAME

[75] Inventors: Doo-yeon Lee, Uiwang; Seok-gwang Doo, Sungnam; Yuong-soo Son; Bok-hwan Jung, both of Seoul, all of Rep. of Korea

[73] Assignee: Samsung Electronics Co., Ltd., Suwon, Rep. of Korea

[21] Appl. No.: 09/148,507

[22] Filed: Sep. 4, 1998

[30] Foreign Application Priority Data

Sep. 4, 1997 [KR] Rep. of Korea ........................ 97-45813
Sep. 1, 1998 [KR] Rep. of Korea ........................ 98-35848

[51] Int. Cl.[7] .................................................. H01M 10/22
[52] U.S. Cl. .................... 429/324; 429/306; 429/231.95; 252/62.2
[58] Field of Search ............................... 429/231.95, 188, 429/306, 324; 252/62.2

[56] References Cited

U.S. PATENT DOCUMENTS

| | | | |
|---|---|---|---|
| 5,501,921 | 3/1996 | Olsen | 429/192 |
| 5,928,812 | 7/1999 | Xue | 429/304 |
| 5,965,293 | 10/1999 | Idota et al. | 429/218.1 |

*Primary Examiner*—Maria Nuzzolillo
*Assistant Examiner*—Monique Wills

*Attorney, Agent, or Firm*—Burns, Doane, Swecker & Mathis, L.L.P.

[57] ABSTRACT

An organic electrolyte containing an organic solvent mixture and a lithium (Li) salt, and a lithium secondary cell adopting the electrolyte. The organic electrolyte contains the organic solvent mixture comprising a solvent having a high dielectric constant, a solvent having a low viscosity and a compound expressed by the following chemical formula (1):

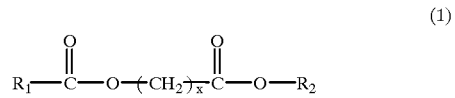

(1)

wherein $R_1$ and $R_2$ are independently $C_1$ to $C_3$ linear or cyclic alkyl, and x is an integer from 1 to 4. The organic electrolyte for a lithium secondary cell is improved in ion conductivity, low-temperature storage characteristics, and a wide potential window region. Also, the lithium salt may be a mixture of inorganic lithium salts and organic lithium salts. A lithium secondary cell adopting the electrolyte containing both inorganic lithium salts and organic lithium salts has a large capacity and stable charging/discharging characteristics, thereby improving high-temperature characteristics, self-discharging characteristics as well as life span characteristics.

14 Claims, 3 Drawing Sheets

ORGANIC ELECTROLYTE AND LITHIUM SECONDARY CELL EMPLOYING THE SAME

This application claims priority under 35 U.S.C. §§119 and/or 365 to 97-45813 filed in Korea on Sep. 4, 1997; and 98-35848 filed in Korea on Sep. 1, 1998, the entire contents of which are hereby incorporated by reference.

BACKGROUND OF THE INVENTION

1. Field of the Invention

The present invention relates to a lithium (Li) secondary cell, and more particularly, to an organic electrolyte for a lithium secondary cell, which can improve high-temperature characteristic, self-discharge characteristics and charging/discharging cycle characteristics as well as cell capacity, withstand low temperatures, and to a lithium secondary cell employing the same.

2. Description of the Related Art

Recently, electronic products have become small, thin and light, and portable electronic products such as camcorders, lap-top computers and cellular phones have become widespread, placing greater demands on the performance of secondary cells used as power sources. As a cell capable of satisfying such demands, a Li secondary rechargeable cell having a small size and a light weight has been focused on and rapidly developed to replace well-known lead-acid cells, nickel-cadmium cells, etc.

A Li rechargeable cell comprises a positive electrode and a negative electrode, each formed of materials capable of allowing intercalation and deintercalation of Li ions, and an organic electrolyte or polymer electrolyte, in which Li ions can move, filled between the positive electrode and the negative electrode. Here, electrical energy is generated by oxidation and reduction reactions when the Li ions are intercalated/deintercalated in the positive electrode and negative electrode.

The positive electrode of the Li rechargeable cell can be formed of a composite oxide of a transition metal and Li, such as lithium cobalt oxide ($LiCoO_2$), lithium nickel oxide ($LiNiO_2$) or lithium manganese oxide ($LiMnO_2$), which has an electric potential higher than that of a $Li/Li^+$ electrode by as much as 3~4.5V, and allows intercalation/deintercalation of Li ions.

The negative electrode is formed of Li metal or its alloy capable of reversibly accepting or providing Li ions without changing its structure and electrical characteristics, or a carbonic material having similar chemical potential to that of Li metal during intercalation/deintercalation of Li ions.

A cell adopting Li metal or its alloy as an active material is called a Li metal cell, and a cell adopting a carbonic material as an active material is called a lithium ion cell. In the Li metal cell using the Li metal or its alloy as a negative electrode, the volume of Li metal changes during charging/discharging, and Li is locally educed on the surface of the Li metal, shorting the cell. Accordingly, the cell becomes unstable and wears out quickly. Thus, it is difficult to introduce the cell to a market. In order to solve these problems, a Li ion cell adopting a carbonic material as a negative electrode active material has been developed. In the Li ion cell, Li ions merely move during charging/discharging, without changing the negative electrode active material, so that the life span and stability are much better than in a Li metal cell.

Also, a Li polymer cell is another type of Li secondary cell, adopting a solid polymer electrolyte. The Li polymer cell can be either a solid Li polymer cell containing solid-type electrolyte without any organic electrolyte, or a gel-type Li polymer cell adopting a gel-type polymer electrolyte containing an organic electrolyte impregnated into a polymer, according to the type of polymer electrolyte. Also, the Li polymer cell can be either a Li ion polymer cell or a Li metal polymer cell, according to the negative electrode active material as described above.

The organic electrolyte is an important factor in determining the performance of the Li polymer cell as well as the Li ion cell. The organic electrolyte, is an ion conductive material obtained by dissolving lithium salts in an organic solvent, and must have excellent Li ion conductivity, and chemical and electrochemical stability with the electrode. Also, its usable temperature range must be wide and it must be cheap to manufacture. Thus, it is preferable to use an organic solvent having high ion conductivity and dielectric constant and low viscosity.

However, because no single organic solvent completely satisfies the above conditions, an organic solvent mixture containing an organic solvent having a high dielectric constant and an organic solvent having a low viscosity is used, e.g., a solvent mixture of carbonic esters containing propylenecarbonate and diethylcarbonate or a solvent mixture containing ethylenecarbonate, dimethylcarbonate and diethylcarbonate.

Such organic solvent mixtures increase the mobility of lithium ions, so ion conductivity is markedly improved and the initial capacity of a cell is increased. However, repeating cycles reduces capacity, due to an oxidation reaction of the electrolyte with a negative electrode active material. Also, due to freezing of the organic solvent at a low temperature, the mobility of Li ions decreases. Accordingly, there is high possibility that the ion conductivity suddenly drops.

Japanese Patent Application Publication No. Heisei 7-169504 discloses an organic electrolyte obtained by adding a third solvent containing methylpropyonate and ethylpropyonate having a very low viscosity to a conventional two-component organic solvent containing a solvent having a high dielectric constant and a low-viscosity solvent. However, even if such an organic electrolyte improves the low-temperature discharge characteristics, the room temperature life span characteristics are deteriorated, and a reaction product of a spontaneous reaction with a collector contaminates the electrolyte, causing poor cell characteristics.

Also, Li salts in an organic electrolyte for a Li secondary cell include $LiClO_4$, $LiPF_6$, $LiCF_3SO_3$, or $LiN(CF_3SO_2)_2$. However, such currently used Li salts have poor thermal stability and low ion conductivity. In particular, because $LiPF_6$ is very sensitive to moisture despite its excellent ion conductivity, the electrolyte itself decomposes easily.

SUMMARY OF THE INVENTION

It is an objective of the present invention to provide an organic electrolyte which does not react easily with a negative electrode active material, thereby providing excellent charging/discharging cycle characteristics to a cell, and which has improved low-temperature characteristics.

It is another objective of the present invention to provide an organic electrolyte capable of improving high-temperature characteristics and self-discharge characteristics of a lithium (Li) secondary cell.

It is still another objective of the present invention to provide a Li secondary cell having improved charging/discharging cycle characteristics, low-temperature characteristics, high-temperature characteristics and self-discharge characteristics by adopting the organic electrolyte.

To achieve the first objective, there is provided an organic electrolyte containing an organic solvent mixture and a lithium (Li) salt, wherein the organic solvent mixture comprising a solvent having a high dielectric constant, a solvent having a low viscosity and a compound expressed by the following chemical formula (1):

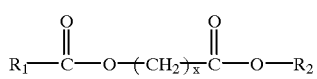

(1)

wherein $R_1$ and $R_2$ are independently $C_1$ to $C_3$ linear or cyclic alkyl, and x is an integer from 1 to 4.

To achieve the second objective, there is provided an organic electrolyte containing an organic solvent mixture and a lithium (Li) salt, wherein the organic solvent mixture comprising a solvent having a high dielectric constant, a solvent having a low viscosity and a compound expressed by the chemical formula (1) and the lithium salt is a mixture of organic lithium salts and inorganic lithium salts.

To achieve the third objective, there is provided a lithium secondary cell comprising:

a positive electrode containing a lithium-containing metal oxide or a sulfide;

a negative electrode containing a lithium metal, a lithium alloy or a carbonic material; and the organic electrolyte according to the present invention.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Figure 1:
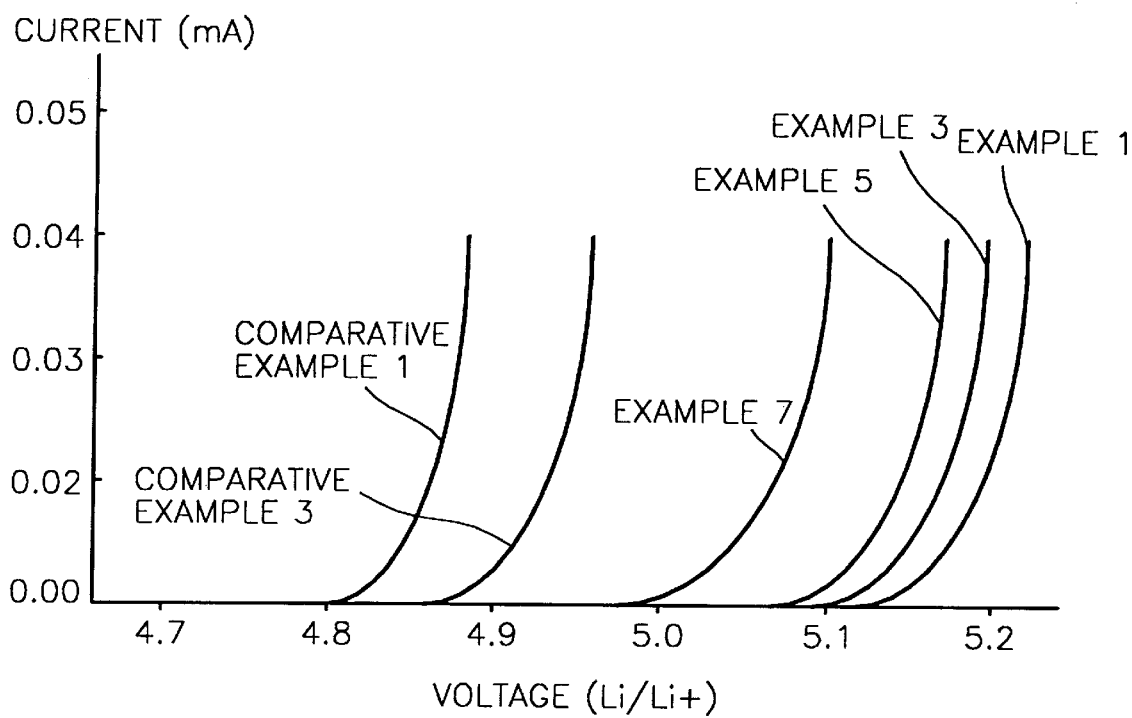
FIG. 1 is a graph showing potential window characteristics of an organic electrolyte according to a preferred embodiment of the present invention.

The organic electrolyte according to the first objective of the present invention is characterized by including the compound expressed by the chemical formula (1). The compound suppresses the oxidation reaction between the electrolyte and a negative electrode active material, and does not decompose easily at high voltages, thereby improving a charging/discharging cycle characteristics of the cell. Also, low-temperature characteristics, which are a significant weak point of the lithium cell, may be improved due to the compound's very low melting point.

The compound expressed by the chemical formula (1) may be dimethylmalonate, diethylmalonate, dimethylsuccinate, dimethylglutarate, dimethyladipate, etc.

Also, the high-dielectric solvent contained in the organic electrolyte of the present invention may have a dielectric constant of 30 or more, and the low-viscosity solvent has a viscosity of 1.5 centipoise (cP) or less.

Preferably, the solvent having a high dielectric constant is at least one selected from the group consisting of ethylenecarbonate, propylenecarbonate and y-butyrolactone and the solvent having a low viscosity is at least one selected from the group consisting of dimethylcarbonate, diethylcarbonate, ethylmethylcarbonate, dimethoxyethane and tetrahydrofuran.

Preferably, the solvent having a high dielectric constant, the solvent having a low viscosity and the compound expressed by the chemical formula (1) are mixed at a ratio of 30~50:30~40:20~30 based on their volume.

Also, the lithium salt added to the organic electrolyte according to the first objective of the present invention, which is well known in the art, may be one or more selected from the group consisting of inorganic lithium salts and organic lithium salts.

The inorganic Li salts, which do not contain carbon in its chemical formula, may be $LiClO_4$, $LiBF_4$, $LiPF_6$, etc.

The organic Li salts, which do contain carbon in its chemical formula, may be $LiCF_3SO_3$, $LiN(CF_3SO_2)_2$, $LiC(CF_3SO_2)_3$, $LiN(C_2F_5SO_2)_2$, etc.

Preferably, the content of the lithium salt is 1~1.5 mole per liter of the organic electrolyte. This is because the ion conductivity of the Li salt contained in the organic electrolyte was the highest in the above range.

On the other hand, the organic electrolyte according to the second objective of the present invention is characterized in that inorganic Li salts, and organic Li salts which have excellent thermal stability and are less affected by moisture, are mixed at a predetermined ratio, improving low-temperature discharge characteristics and self-discharge characteristics.

The inorganic Li salts which can be used in the Li salt mixture containing the inorganic and organic Li salts may be any Li compound capable of being dissociated in an organic solvent to generate Li ions without restriction, preferably fluoric Li salts having excellent electrical characteristics.

The organic Li salts which can be used in the Li salt mixture containing the inorganic and organic Li salts may be one or more selected from the group consisting of $LiN(CF_3SO_2)_2$, $LiC(CF_3SO_2)_3$ and $LiN(C_2F_5SO_2)_2$. The compounds have a high-thermal decomposition temperature and are less affected by moisture, thereby improving high-temperature characteristics and self-discharging characteristics of the organic electrolyte.

Preferably, the inorganic Li salts and the organic Li salts are mixed at a mole ratio of 0.7~0.9:0.3~0.1. If the mole ratio of the organic Li salts is over 0.3, the ion conductivity of the electrolyte suddenly decreases, deteriorating the capacity characteristics of the cell. Meanwhile, if the mole ratio of the organic salts is less than 0.1, the self-discharge characteristics are not improved.

Also, in order to further improve the self-discharge characteristics, the organic electrolyte of the present invention may further contain an inorganic additive. The inorganic additive may be $LiBO_2$, $Li_2CO_3$, $Li_3PO_4$, $Li_3N$, $SnO2$, etc., preferably, $LiBO_2$. For example, boron (B) has a valence of 3 and a nonbonding electron, so that boron acts as an electron acceptor receiving electrons from carbon a negative electrode active material. Thus, the bonding force between carbon and boron considerably increases, and a chemical potential of a negative electrode also increases by as much as the bonding force, causing a tendency to further receive Li$^+$. Also, the concentration of Li$^+$ in the negative electrode increases, thereby improving the capacity of the cell. Preferably, the amount of inorganic additive added for such effect is $1\times10^{-4}$~$5\times10^{-2}$ mole per liter of the organic electrolyte.

The organic electrolyte of the present invention can be applied to a Li ion polymer cell adopting a gel-type polymer electrolyte, that is, all kinds of Li secondary cell except for a solid-type Li polymer cell.

Hereinafter, the present invention will be described through the following examples and comparative examples. However, the present invention is not limited to the following examples.

In the following examples, LiPF$_6$ (cell reagent grade, Hashimoto Co., Japan), LiN(CF$_3$SO$_2$)$_2$, LiC(CF$_3$SO$_2$)$_3$ and LiN(C$_2$F$_5$SO$_2$)$_2$ (cell reagent grade, 3M, USA) were used without refining. The solvent used for preparing an organic electrolyte was a cell reagent grade product manufactured by Merck Co. (Germany). All experiments were performed under at least 99.9% argon (Ar) gas atmosphere.

EXAMPLE 1

First, a reagent bottle containing solid ethylenecarbonate was put in an electrical mantle and slowly heated to 70~80° C. to be liquefied. Then, after adding LiPF$_6$ for preparing 1 mol of LiPF$_6$ solution in a plastic bottle in which the electrolyte is to be stored, dimethylcarbonate was added to the bottle, and then vigorously shaken to dissolve the Li metal salt. Then, the liquefied ethylenecarbonate solution was added while shaking to mix uniformly. Then, after adding dimethylmalonate, which is the compound expressed by the chemical formula (1), to the mixture, the mixture was vigorously mixed, resulting in an organic electrolyte. Here, ethylenecarbonate, dimethylcarbonate and dimethylmalonate were added at a ratio of 40:40:30 based on the volume.

The obtained organic electrolyte was stored in a dry box for 20 days, and the water content thereof was measured by the Karl-Fisher titration method using a coulometer (737KF, Metrom Co., Switzerland). As a result, the organic electrolyte was found to contain water of approximately 20 ppm.

EXAMPLE 2

An organic electrolyte was prepared by the same method as in Example 1 except that diethylmalonate was used as the compound expressed by the chemical formula (1) instead of dimethylmalonate.

EXAMPLE 3

An organic electrolyte was prepared by the same method as in Example 1 except that dimethylsuccinate was used as the compound expressed by the chemical formula (1) instead of dimethylmalonate.

EXAMPLE 4

An organic electrolyte was prepared by the same method as in Example 1 except that dimethylglutarate was used as the compound expressed by the chemical formula (1) instead of dimethylmalonate.

EXAMPLE 5

An organic electrolyte was prepared by the same method as in Example 1 except that dimethyladipate was used as the compound expressed by the chemical formula (1) instead of dimethylmalonate.

EXAMPLE 6

An organic electrolyte was prepared by the same method as in Example 1 except that ethylenecarbonate, dimethylcarbonate and dimethylmalonate were mixed at a ratio of 40:40:20 based on their volume.

EXAMPLE 7

An organic electrolyte was prepared by the same method as in Example 1 except that ethylenecarbonate, dimethylcarbonate and dimethylmalonate were mixed at a ratio of 50:30:20 based on their volume.

COMPARATIVE EXAMPLE 1

An organic electrolyte was prepared by the same method as in Example 1 except that dimethylmalonate was not added to the organic solvent mixture. Here, ethylenecarbonate and dimethylcarbonate was mixed at a ratio of 1:1 based on their volume.

COMPARATIVE EXAMPLE 2

An organic electrolyte was prepared by the same method as in Example 1 except that ethylenecarbonate, dimethylcarbonate and dimethylmalonate were mixed at a ratio of 60:20:20 based on their volume.

COMPARATIVE EXAMPLE 3

An organic electrolyte was prepared by the same method as in Example 1 except that ethylenecarbonate, dimethylcarbonate and dimethylmalonate were mixed at a ratio of 30:30:40 based on their volume.

Ion conductivity, low-temperature storage characteristics, and potential window characteristics of the organic electrolytes prepared by Examples 1 through 7 and Comparative Examples 1 through 3 were measured.

1) Ion conductivity of electrolyte

A non-blocking measuring cell was installed in a dry box. Approximately 8 ml of electrolyte to be tested and a platinum electrode were used, and the cell was stored in a thin metal case for preserving reagents, in order to prevent the cell from contacting air. The cell was drawn out of the thin metal case and held in an incubator maintaining a constant temperature and humidity for 1 hour. Then, impedance was measured using an impedance analyzer(Solatrou 1287, USA) to evaluate conductivity.

2) Low-temperature storage characteristics 15 ml of electrolyte was put into two 30 ml-plastic containers, and the containers were lidded and sealed with a paraffin film to completely block contact with air. The containers were put into an incubator (TABAI) and held respectively at −30° C. and −40° C. for 24 hours. Then, it was visually checked whether or not the electrolyte froze. In Table 1, x means the electrolyte was not frozen and o means the electrolyte was frozen.

3) Potential window

Potential window ranges of the electrolytes prepared by Examples 1 through 7 and Comparative Examples 1 through 3 were measured by cyclic voltammography. A three electrode system with a reference electrode, a carbon electrode and a Li metal electrode was used. Scanning rate at 1 MHz frequency was set to 1 mV/sec, and the results are shown in Table 1.

4) Charging/discharging life span characteristics

Figure 3:
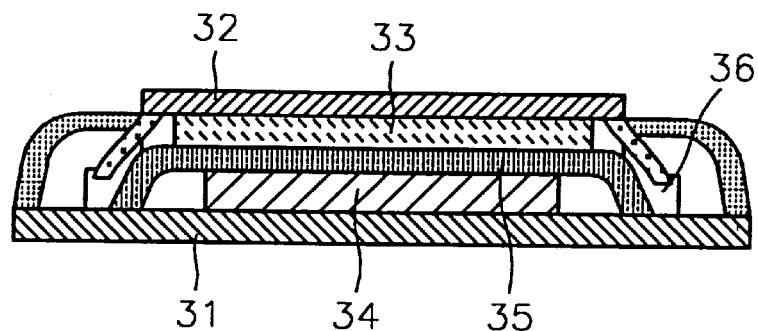
FIG. 3 is a sectional view of a coin type cell adopting an organic electrolyte according to a preferred embodiment of the present invention.

In order to evaluate charging/discharging life span characteristics of cells manufactured using the organic electrolytes prepared by Examples 1 through 7 and Comparative Examples 1 through 3, coin type cells (2016) of FIG. 3 were manufactured.

$LiCoO_2$, Super-P carbon (M.M.M. Carbon Co., Belgium) and polytetrafluoroethylene dissolved in N-methylpyrrolidone were mixed to prepare a paste type positive electrode active material. Then, the obtained paste type positive electrode active material was cast on aluminum foil having a thickness of 200 μm, dried, pressed, and then cut, resulting in a positive electrode 34 for a coin type cell.

Also, graphite powder (MCMB 2528, Osaka Gas Co., Japan), Super-P carbon (M.M.M. Carbon Co.) and polytetrafluoroethylene dissolved in N-methylpyrrolidone were mixed to prepare a paste type negative electrode active material. Then, the obtained paste type negative electrode active material was cast on aluminum foil having a thickness of 200 μm, dried, pressed, and then cut, resulting in a negative electrode 33 for a coin type cell.

The Cellgard 2400 (manufactured by Hoechst Cellanese Co.) was used as a separator 35. The separator 35 was placed between the negative electrode and positive electrode and soaked in the electrolytes prepared by Examples 1 through 7 and Comparative Examples 1 through 3 for 10 minutes. After 10 minutes, the separator, the negative electrode and the positive electrode were drawn out of the electrolytes, and coin type cells (2016) completely sealed by a stainless case 31, a stainless lid 32 and an insulation gasket 36 were manufactured using a clamp machine. Here, the capacity of each cell was 3.15 mAh.

The initial capacity and the capacity change after 100 and 200 cycles of charging/discharging of the obtained coin type cells were measured, and the results are expressed as values relative to the initial capacity. A charger/discharger (Maccor Co.) having a capacity of 1A was used. Also, the charging and discharging test was performed at 25° C. at a rate of 0.2C, and the charging voltage was 3.0~4.2V.

The ion conductivities, low-temperature storage characteristics and charging/discharging life span characteristics of the electrolytes prepared by Examples 1 through 7 and Comparative Examples 1 through 3 are shown in Table 1

TABLE 1

| example | ion conductivity (25° C., s/cm) | low-temperature storage characteristics at −30° C. | low-temperature storage characteristics at −40° C. | initial capacity (mAh) | charging/discharging life span characteristics relative capacity change after 100 cycles (%) | charging/discharging life span characteristics relative capacity change after 200 cycles (%) |
|---|---|---|---|---|---|---|
| Example 1 | $1.124 \times 10^{-2}$ | x | x | 2.89 | 92 | 87 |
| Example 2 | $1.226 \times 10^{-2}$ | x | x | 2.91 | 90 | 85 |
| Example 3 | $1.137 \times 10^{-2}$ | x | x | 2.88 | 90 | 86 |
| Example 4 | $1.123 \times 10^{-2}$ | x | x | 2.86 | 91 | 87 |
| Example 5 | $1.118 \times 10^{-2}$ | x | x | 2.84 | 90 | 85 |
| Example 6 | $1.116 \times 10^{-2}$ | x | x | 2.85 | 90 | 86 |
| Example 7 | $1.133 \times 10^{-2}$ | x | x | 2.87 | 91 | 85 |
| Comparative Example 1 | $1.420 \times 10^{-2}$ | o | o | 2.88 | 93 | 87 |
| Comparative Example 2 | $1.475 \times 10^{-2}$ | o | o | 2.91 | 85 | 79 |
| Comparative Example 3 | $1.112 \times 10^{-2}$ | x | x | 2.77 | 82 | 75 |

From Table 1 and FIG. 1, it is clear that the electrolytes and the lithium ion cells employing the same according to the present invention show a high ion conductivity more than $1 \times 10^{-2}$ s/cm and excellent low-temperature storage characteristics. Also, the cell capacities after 100 cycles and 200 cycles were more than 90% and 85%, respectively, with respect to the initial capacity. Thus, such low capacity change according to the cycle repetition shows that the life span characteristics are very good. Referring to FIG. 1, the potential window region is wide, so stable cell characteristics can be maintained over a wide voltage range.

EXAMPLE 8

An organic electrolyte was prepared by the same method as in Example 1 except that 0.9M of $LiPF_6$ and 0.1M of $LiC(CF_3SO_2)_3$ were used as Li salts, and ethylenecarbonate as a solvent having a high-dielectric constant, ethylmethylcarbonate as a low-viscosity solvent and dimethylsuccinate as a third solvent were used.

EXAMPLE 9

An organic electrolyte was prepared by the same method as in Example 8 except that dimethylglutarate was used as a third solvent.

EXAMPLE 10

An organic electrolyte was prepared by the same method as in Example 8 except that dimethyladipate was used as a third solvent.

EXAMPLE 11

An organic electrolyte was prepared by the same method as in Example 8 except that 0.8M of $LiPF_6$ and 0.2M of $LiC(CF_3SO_2)_3$ were used as Li salts.

EXAMPLE 12

An organic electrolyte was prepared by the same method as in Example 8 except that 0.7M of $LiPF_6$ and 0.3M of $LiC(CF_3SO_2)_3$ were used as Li salts.

EXAMPLE 13

An organic electrolyte was prepared by the same method as in Example 8 except that $LiBO_2$ of $2 \times 10^{-2}$ M was further added.

COMPARATIVE EXAMPLE 4

An organic electrolyte was prepared by the same method as in Example 8 except that ethylenecarbonate and dimethylcarbonate were used at a ratio of 2:1 based on their volume, without adding ethylmethylcarbonate, and only 1M of $LiPF_6$ was used without adding $LiC(CF_3SO_2)_3$.

COMPARATIVE EXAMPLE 5

An organic electrolyte was prepared by the same method as in Comparative Example 4 except that ethylenecarbonate and ethylmethylcarbonate, instead of dimethylcarbonate, were used at a ratio of 1:1 based on their volume.

COMPARATIVE EXAMPLE 6

An organic electrolyte was prepared by the same method as in Example 8 except that 0.6M of $LiPF_6$ and 0.4M of $LiC(CF_3SO_2)_3$ were used as Li salts.

Figure 2:
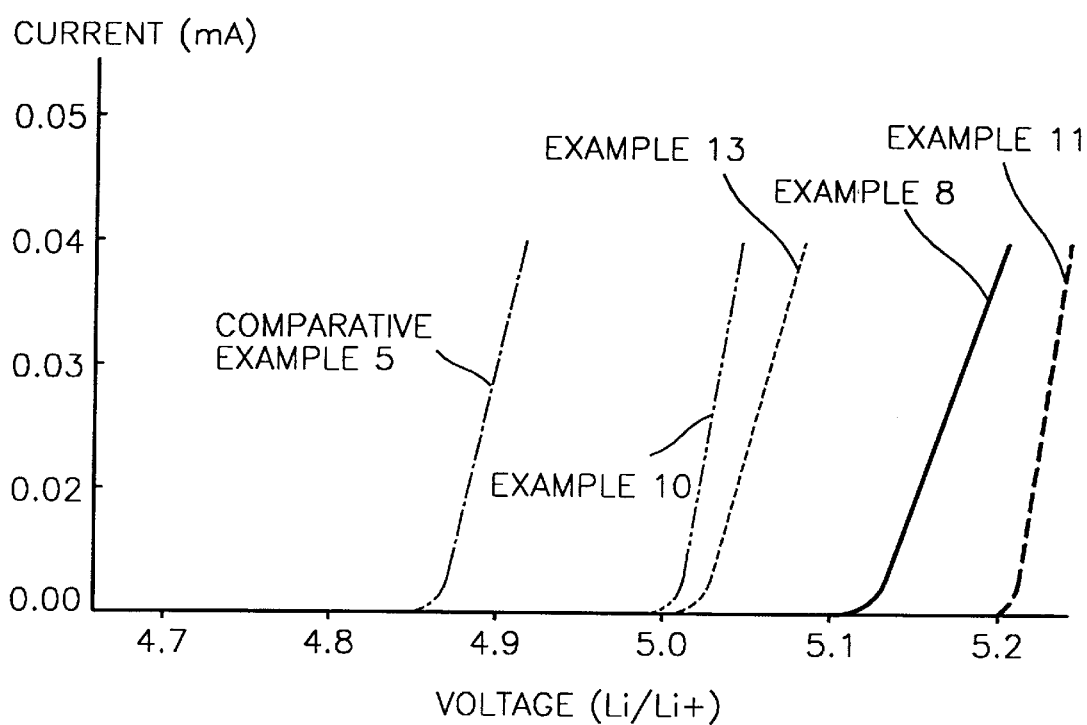
FIG. 2 is a graph showing potential window characteristics of an organic electrolyte according to another preferred embodiment of the present invention.

Ion conductivities and potential window characteristics of the organic electrolytes prepared by Examples 8 through 13 and Comparative Examples 4 through 6 were measured, and the results are shown in Table 2 and FIG. 2.

TABLE 2

| example | ion conductivity (20° C., s/cm) | potential window region (V) |
|---|---|---|
| Example 8 | $1.124 \times 10^{-2}$ | 5.12 |
| Example 9 | $1.126 \times 10^{-2}$ | 5.04 |
| Example 10 | $1.137 \times 10^{-2}$ | 4.98 |
| Example 11 | $1.223 \times 10^{-2}$ | 5.19 |
| Example 12 | $1.118 \times 10^{-2}$ | 5.02 |
| Example 13 | $1.216 \times 10^{-2}$ | 5.06 |
| Comparative Example 4 | $1.133 \times 10^{-2}$ | 4.89 |
| Comparative Example 5 | $1.220 \times 10^{-2}$ | 4.85 |
| Comparative Example 6 | $1.112 \times 10^{-2}$ | 4.87 |

Figure 4:
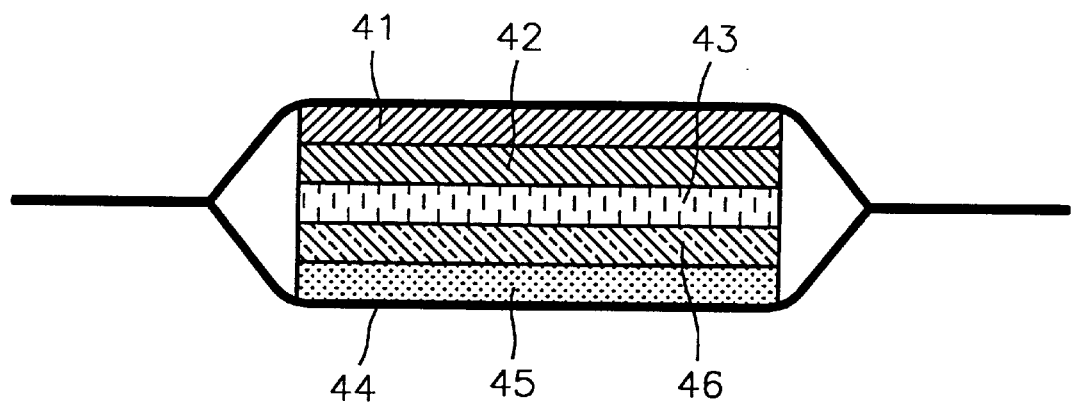
FIG. 4 is a sectional view of a angular type Li ion polymer cell adopting an organic electrolyte according to another preferred embodiment of the present invention.

The organic electrolytes prepared by Examples 8 through 13 and Comparative Examples 4 through 6 were applied to Li ion polymer cells of FIG. 4. A copolymer (PvdF-HFP) of polyvinylidedfluoride and hexafluoropropylene, Kynar 2801 (Altochem. Co.), was used as a polymer matrix.

In order to form a positive electrode 46, 65 wt % of $LiCoO_2$ as a positive electrode active material, 20 wt % of dibutylphthalate and 15 wt % of Kynar 2801 were added to 450 ml of acetone, shaken, and put in an oven set to 50~60° C. to dissolve the Kynar 2801. After mixing the solution for 48 hours using a ball mill, the mixture was cast to a thickness of 120 μm using a doctor blade, and dried, resulting in a positive electrode.

A negative electrode 42 was formed by the same method as the positive electrode, except that graphite carbon active material of 65 wt % as a negative electrode active material, instead of the positive electrode active material, was used.

In order to form a separator 43, 30 g of Kynar 2801, 40 g of dibutylphthalate and 30 g of silicon oxide were added to 250 ml of acetone, mixed, and put in an oven set to 50~60° C. to dissolve the polymer. Then, the mixture was cast to a thickness of 50~55 μm using a doctor blade, and dried in air to volatilize the acetone.

A Li ion polymer cell was assembled from the above formed positive electrode 46, negative electrode 42 and separator 43, a copper collector 41 and an aluminum collector 45.

Then, the following characteristics were measured on the obtained Li ion polymer cells.

1) Charging/discharging life span characteristics

In the case where $LiCoO_2$ is used as a positive electrode active material, the theoretical capacity of the cell was calculated based on a capacity of 130 mAh/g, and the capacities of the positive electrode and negative electrode were adjusted to be 1:2.1~2.2. The capacity of the cell was 170 mAh, and the initial capacity was 177 mAh. The forming of the cell was accomplished by charging and discharging repeated twice within a voltage range of 2.8~4.2V by 10 hour rate.

The charging/discharging test of the cell was then performed within 2.8~4.2V by 2 hour rate under a constant-current/constant-voltage. The constant-voltage section was set to 1/10 of the constant-current section. The capacity of the cell after the charging/discharging test, and charging/discharging cycle life span characteristics are shown in Table 3.

2) Low-temperature discharge characteristics

The cells manufactured using the organic electrolytes of Examples 8 through 13 and Comparative Examples 4 through 6 were charged to 4.2V by 2 hour rate under a constant-current/constant-voltage. The charged cells were left at −20° C. for 17 hours, and discharged to 2.75V by 0.5 hour rate. The results are shown in Table 3.

3) Self-discharge characteristics

In order to evaluate capacity decrease ratios by self-discharging of the cells manufactured using the organic electrolytes prepared by Examples 8 through 13 and Comparative Examples 4 through 6, the cells having gone through forming were charged to 4.2V by 5 hour rate under a constant-current/constant-voltage, and discharged by 5 hour rate. Then, the cells were recharged to 4.2V by 2 hour rate under a constant-current/constant-voltage, left at 20° C. for 30 days, and then discharged to 2.75V by 2 hour rate. The results are shown in Table 3.

TABLE 3

| example | low temperature discharge characteristics | | charging/discharging life span characteristics relative capacity | | self-discharging ratio (20° C., %) |
|---|---|---|---|---|---|
| | discharging capacity (mAh) | discharging ratio (%) | cell capacity after 100 cycles | to initial capacity after 100 cycles (%) | |
| Example 8 | 149.39 | 84.4 | 166.03 | 93.8 | 10.7 |
| Example 9 | 145.86 | 82.4 | 161.96 | 91.5 | 11.5 |
| Example 10 | 139.21 | 78.6 | 158.59 | 89.6 | 12.6 |
| Example 11 | 147.65 | 83.4 | 167.62 | 94.7 | 9.1 |
| Example 12 | 145.45 | 82.18 | 166.38 | 94.0 | 11.98 |
| Example 13 | 151.69 | 85.7 | 168.46 | 95.14 | 10.87 |
| Comparative Example 4 | 25.134 | 14.2 | 164.08 | 92.7 | 14.1 |

TABLE 3-continued

| example | low temperature discharge characteristics | | charging/discharging life span characteristics | | self-discharging ratio (20° C., %) |
| --- | --- | --- | --- | --- | --- |
| | discharging capacity (mAh) | discharging ratio (%) | cell capacity after 100 cycles | relative capacity to initial capacity after 100 cycles (%) | |
| Comparative Example 5 | 115.23 | 65.1 | 154.34 | 87.2 | 13.8 |
| Comparative Example 6 | 97.03 | 54.8 | 145.67 | 82.3 | 12.9 |

As can be seen in Table 3, the life span characteristics of the cells using the electrolytes of Examples 8 through 13 are similar to the case only using an inorganic Li salt, or slightly improved, compared to the organic electrolytes of Comparative Examples 4 through 6. But, the low-temperature discharge characteristics and self-discharge characteristics at room temperature are improved. Also, the self-discharge characteriatics at high temperature(60° C.) is improved by using a mixture of inorganic Li salts and organic Li salts.

The organic electrolyte for a Li secondary cell according to the present invention contains the compound expressed by the chemical formula (1), so that the ion conductivity and low-temperature storage characteristics thereof are excellent, the potential window region thereof becomes wide, and the charging/discharging life span characteristics are excellent. Also, in the organic electrolyte for a Li secondary cell according to the present invention, containing an inorganic Li salt and an organic Li salt at a predetermined ratio, capacity characteristics are improved due to a higher self-discharging ratio, and high-temperature discharge characteristics are improved due to its excellent thermal stability. Thus, the Li secondary cell adopting the electrolyte according to the present invention has a large capacity and shows stable charging/discharge characteristics after repeated charging and discharging. Also, the Li secondary cell containing the electrolyte has excellent in low-temperature storage characteristics, high-temperature characteristics and life span characteristics.

What is claimed is:

1. An organic electrolyte containing an organic solvent mixture and a lithium (Li) salt, wherein the organic solvent mixture comprises a solvent having a high dielectric constant, a solvent having a low viscosity and a compound expressed by the following chemical formula (1):

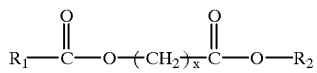
(1)

wherein $R_1$ and $R_2$ are independently $C_1$ to $C_3$ linear or cyclic alkyl, and x is an integer from 1 to 4.

2. The organic electrolyte of claim 1, wherein the solvent having a high dielectric constant, the solvent having a low viscosity and the compound expressed by the chemical formula (1) are mixed at a ratio of 30~50:30~40:20~30 based on their volume.

3. The organic electrolyte of claim 1, wherein the solvent having a high dielectric constant is at least one selected from the group consisting of ethylenecarbonate, propylenecarbonate and γ-butyrolactone.

4. The organic electrolyte of claim 1, wherein the solvent having a low viscosity is at least one selected from the group consisting of dimethylcarbonate, diethylcarbonate, ethylmethylcarbonate, dimethoxyethane and tetrahydrofuran.

5. The organic electrolyte of claim 1, wherein the compound expressed by the chemical formula (1) is at least one selected from the group consisting of dimethylmalonate, diethylmalonate, dimethylsuccinate, dimethylglutarate and dimethyladipate.

6. The organic electrolyte of claim 1, wherein the content of the lithium salt is 1~1.5 mole per liter of the organic electrolyte.

7. The organic electrolyte of claim 6, wherein the lithium salt is at least one selected from the group consisting of inorganic lithium salts and organic lithium salts.

8. The organic electrolyte of claim 7, wherein the lithium salt is a mixture of organic lithium salts and inorganic lithium salts.

9. The organic electrolyte of claim 8, wherein the inorganic lithium salts are fluoric lithium salts.

10. The organic electrolyte of claim 8, wherein the organic lithium salts are at least one selected from the group consisting of $LiN(CF_3SO_2)_2$, $LiC(CF_3SO_2)_3$ and $LiN(C_2F_5SO_2)_2$.

11. The organic electrolyte of claim 8, wherein the inorganic lithium salts and the organic lithium salt are mixed at a mole ratio of 0.7~0.9:0.3~0.1.

12. The organic electrolyte of claim 1, further comprising an inorganic additive of $1\times10^{-4}$~$5\times10^{-2}$ mole per liter of the organic electrolyte.

13. The organic electrolyte of claim 12, wherein the inorganic additive is at least one selected from the group consisting of $LiBO_2$, $Li_2CO_3$, $Li_3PO_4$, $Li_3N$ and $SnO_2$.

14. A lithium secondary cell comprising:

a positive electrode containing a lithium-containing metal oxide or a sulfide;

a negative electrode containing a lithium metal, a lithium alloy or a carbonic material; and the organic electrolyte according to claim 1.

* * * * *